(12) United States Patent
Holland et al.

(10) Patent No.: US 8,733,479 B2
(45) Date of Patent: May 27, 2014

(54) REMOTE CONTROLLED LOAD TRANSPORT SYSTEM

(75) Inventors: Christopher M. Holland, Forest City, IA (US); Constantine Marmaras, Forest City, IA (US); Paul B. Oulman, Forest City, IA (US)

(73) Assignee: Holland Moving & Rigging Supplies, Inc., Forest City, IA (US)

( * ) Notice: Subject to any disclaimer, the term of this patent is extended or adjusted under 35 U.S.C. 154(b) by 0 days.

(21) Appl. No.: 13/545,112

(22) Filed: Jul. 10, 2012

(65) Prior Publication Data

US 2013/0017047 A1  Jan. 17, 2013

Related U.S. Application Data

(60) Provisional application No. 61/506,281, filed on Jul. 11, 2011.

(51) Int. Cl.
*B60P 1/02* (2006.01)

(52) U.S. Cl.
USPC .......... 180/65.1; 180/167; 280/6.15; 414/495

(58) Field of Classification Search
USPC .................. 280/6.15, 6.151, 400, 415.1, 442, 280/490.1, 781, 124.1, 773, 774; 414/467, 414/495, 496, 458, 459, 476; 111/100, 101, 111/103; 180/167, 65.1, 19.1
See application file for complete search history.

(56) References Cited

U.S. PATENT DOCUMENTS

| | | | | |
|---|---|---|---|---|
| 1,734,330 | A * | 11/1929 | Grab | 414/459 |
| 1,757,798 | A * | 5/1930 | Grab | 414/459 |
| 2,410,965 | A * | 11/1946 | Dimick | 414/459 |
| 2,902,183 | A * | 9/1959 | Dodge | 414/459 |
| 3,305,116 | A * | 2/1967 | McKee | 414/459 |
| 4,003,583 | A * | 1/1977 | Stanzel | 280/43.22 |
| 4,500,248 | A * | 2/1985 | Kramer | 414/459 |
| 4,880,347 | A * | 11/1989 | Lombard | 414/542 |
| 5,915,912 | A * | 6/1999 | Parnes et al. | 414/544 |
| 6,530,333 | B1 * | 3/2003 | Cox | 111/101 |
| 6,848,879 | B2 * | 2/2005 | Odorizzi | 414/459 |
| 2006/0096664 | A1 * | 5/2006 | Dubbs et al. | 144/24.12 |
| 2013/0051971 | A1 * | 2/2013 | Wyse et al. | 414/812 |

OTHER PUBLICATIONS

Loren G. Helmrich; Environmental Design—20, Boxed Tree Transporter; Email to Josef Hoffmann; Oct. 10, 2011; 1 page; Texas, USA.
Mark Merit; 911 Memorial Revised Quote; Email to Constantine Marmaras; Feb. 7, 2011; 1 page; USA.
Mark Merit; Current Lifting Scheme; Email to Paul Oulman; Nov. 17, 2010; 2 pages; USA.
Mark Merit; Thinking Inside the Box; Email to Paul Oulman; Nov. 17, 2010; 2 pages; USA.

(Continued)

*Primary Examiner* — John Walters
*Assistant Examiner* — Brian Swenson
(74) *Attorney, Agent, or Firm* — Zarley Law Firm, P.L.C.

(57) ABSTRACT

A remote controlled load transport system that has a frame with a retractable gate assembly that is able to retract in order to accommodate a load. A control system is provided having a drive that operates and rotates and steers a wheel. The control system and the gate are remotely controlled by an electronic controller that is in electronic communication with the control system to remotely operate the transport system, open the gate, lift a load and haul the load to a desired location.

19 Claims, 5 Drawing Sheets

(56) References Cited

OTHER PUBLICATIONS

Mark Merit; Tree Mover; Email to Paul Oulman; Nov. 15, 2010; 1 page; USA.
Mark Merit; Dollies; Email to Paul Oulman; Nov. 2, 2010; 2 pages; USA.
Mark Merit; Sep. 11 Memorial; Email to Paul Oulman; Jun. 7, 2009; 2 pages, USA.
Mark Merit; Sep. 11 Memorial; Email to Paul Oulman; Jun. 3, 2099; 2 pages, USA.

\* cited by examiner

REMOTE CONTROLLED LOAD TRANSPORT SYSTEM

CROSS REFERENCE TO RELATED APPLICATION

This application claims the benefit of U.S. Provisional Application No. 61/506,281 filed Jul. 11, 2011.

BACKGROUND OF THE INVENTION

This invention relates to a remote controlled load transport system. More specifically, this invention relates to a remotely operated transport vehicle that is able to lift heavy loads for transportation from a work site.

In many industries large objects or loads must be lifted and transported great distances from one location to another. For example, when roadways and bridges are being constructed large pieces such as bridge decking are transported to a site by heavy duty trucks and then must be lifted from these trucks with cranes and other heavy duty equipment to be placed in a desired location. Oftentimes these loads need to be moved at the site location to different places including above and below the grade of the ground. Such lifting, hauling and moving of these pieces is difficult, dangerous, time consuming and expensive.

In other applications other loads such as full grown trees is desired. In these applications, again, a tree must be lifted from the ground with heavy duty equipment and placed on a platform of a vehicle that can oftentimes be difficult to maneuver causing additional time, risk and expensive to be provided during the loading and unloading processes. Thus, a need in the art exists in the art for a device or mechanism that will facilitate the movement of heavy loads, allowing for steering across multiple terrains and angles in order to provide improved maneuverability and to improve safety and costs associated with moving heavy loads.

Thus, a principal object of the present invention is to provide a remote controlled load transport system that facilitates the moving of large loads.

Yet another object of the present invention is to provide a remote controlled load transport system with enhanced maneuvering.

These and other objects, features, and advantages will become apparent from the specification and claims.

BRIEF SUMMARY OF THE INVENTION

A remote controlled load transport system that has a frame that is attached to a suspension that is attached to a wheel. A controlled system is provided that has a drive that operates to rotate the wheel and an electronic controller remote from the frame and in electronic communication with the control system to drive and steer the wheel. The frame additionally has a retractable gate assembly that is electronically controlled by the electronic controller to retract to accommodate a load.

DETAILED DESCRIPTION OF THE PREFERRED EMBODIMENT

Figure 1:
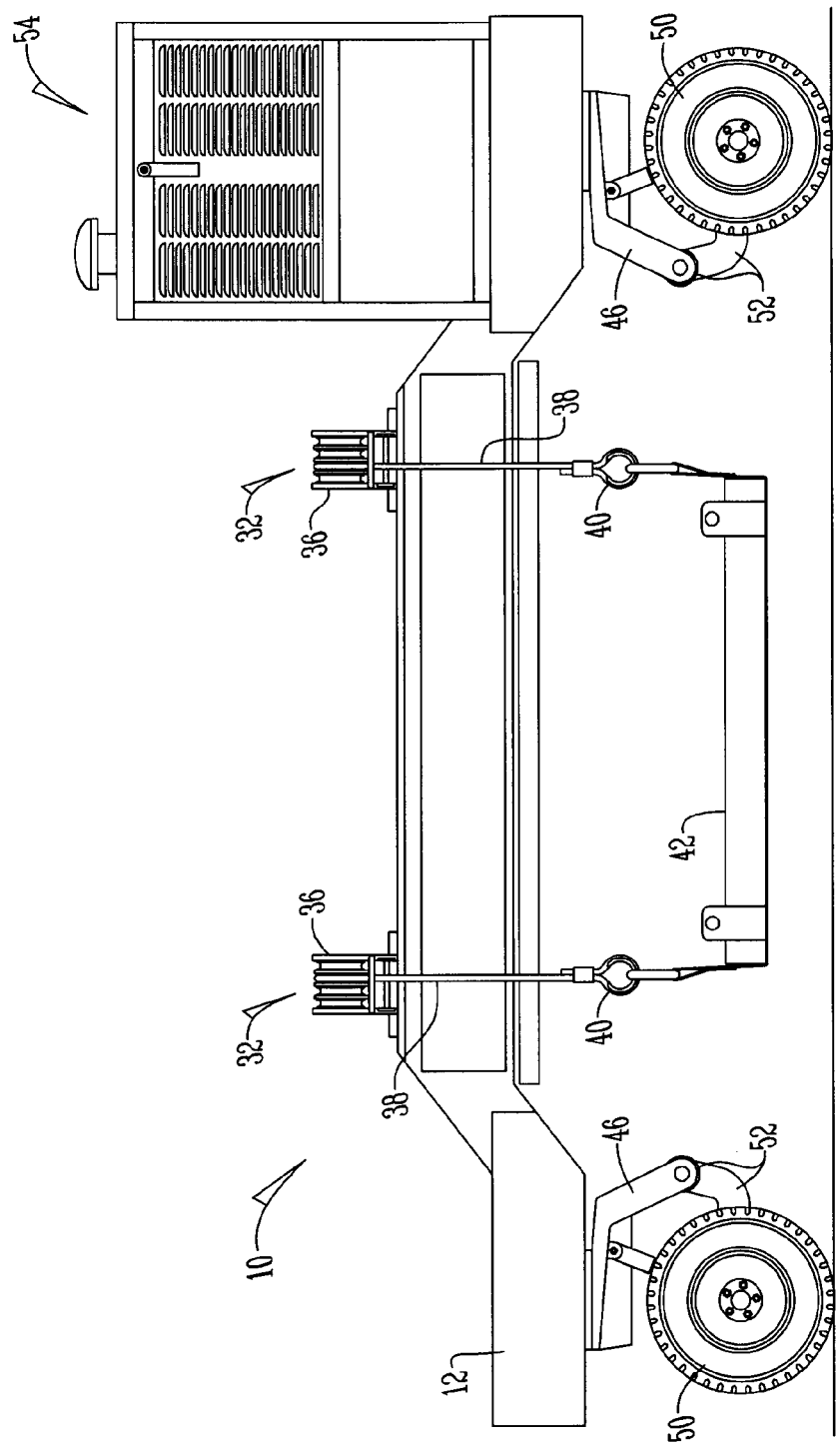
FIG. 1 is a side perspective view of a remote controlled load transport system.
Figure 2:
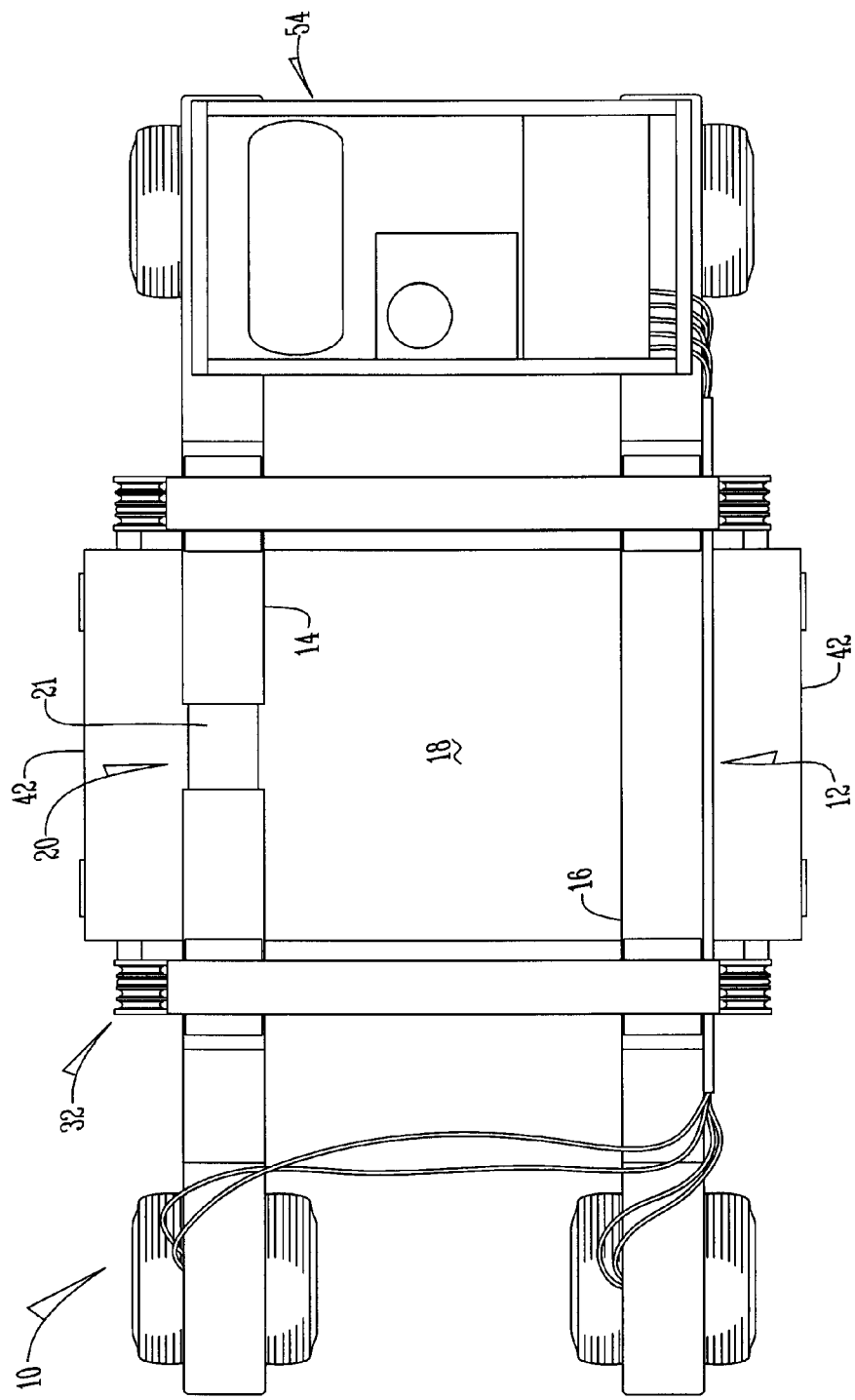
FIG. 2 is a top plan view of a remote controlled load transport system carrying a load.
Figure 3:
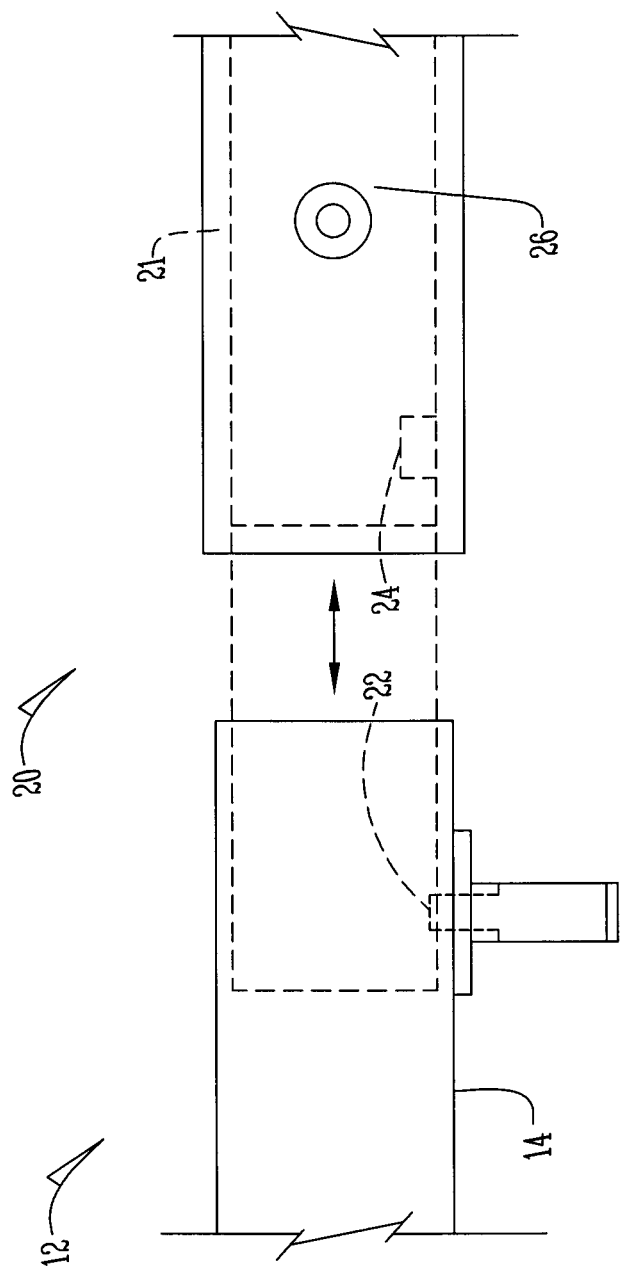
FIG. 3 is side cut-away plan view of a gate assembly.
Figure 4:
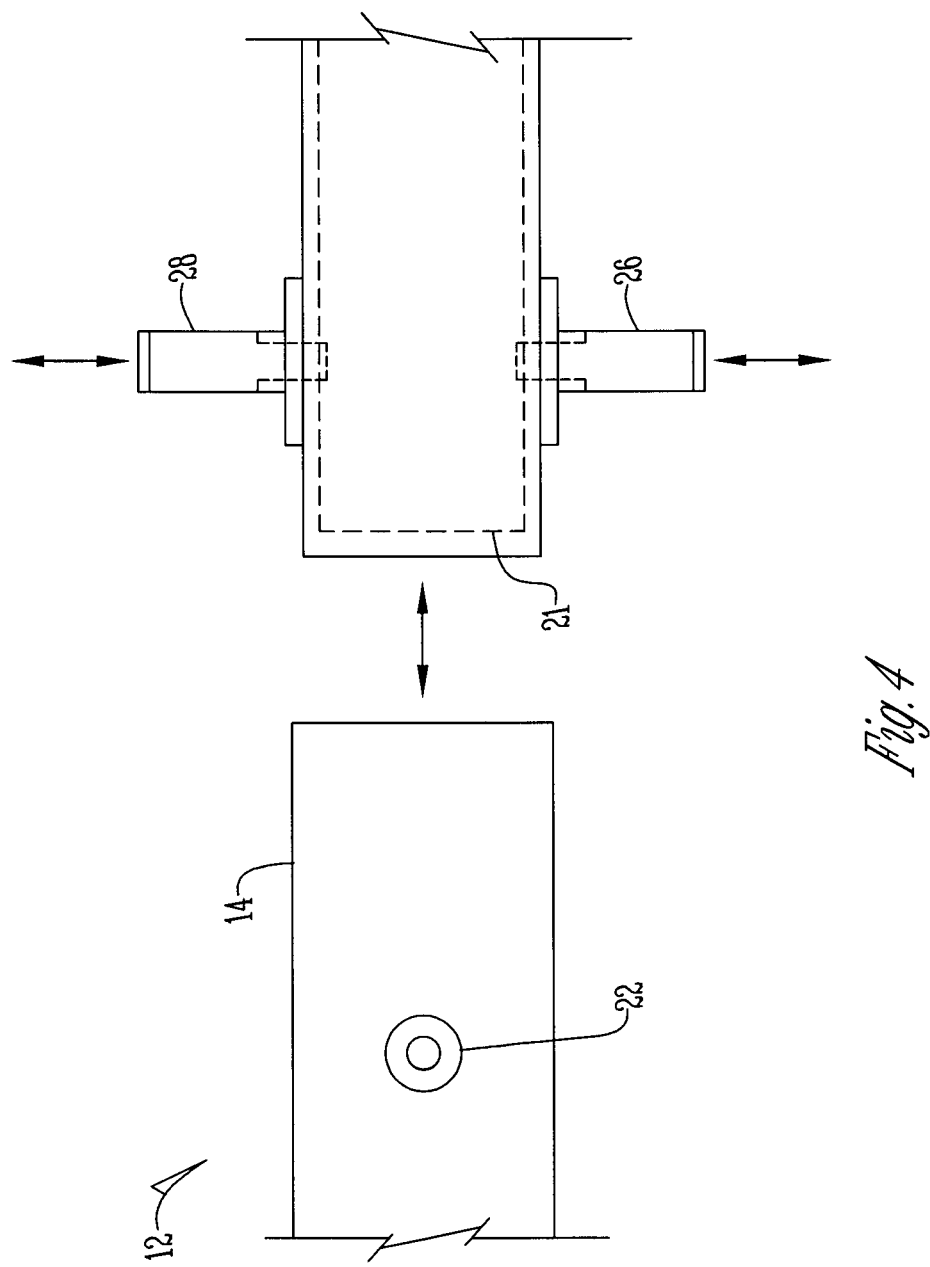
FIG. 4 is a top plan view of a gate assembly.
Figure 5:
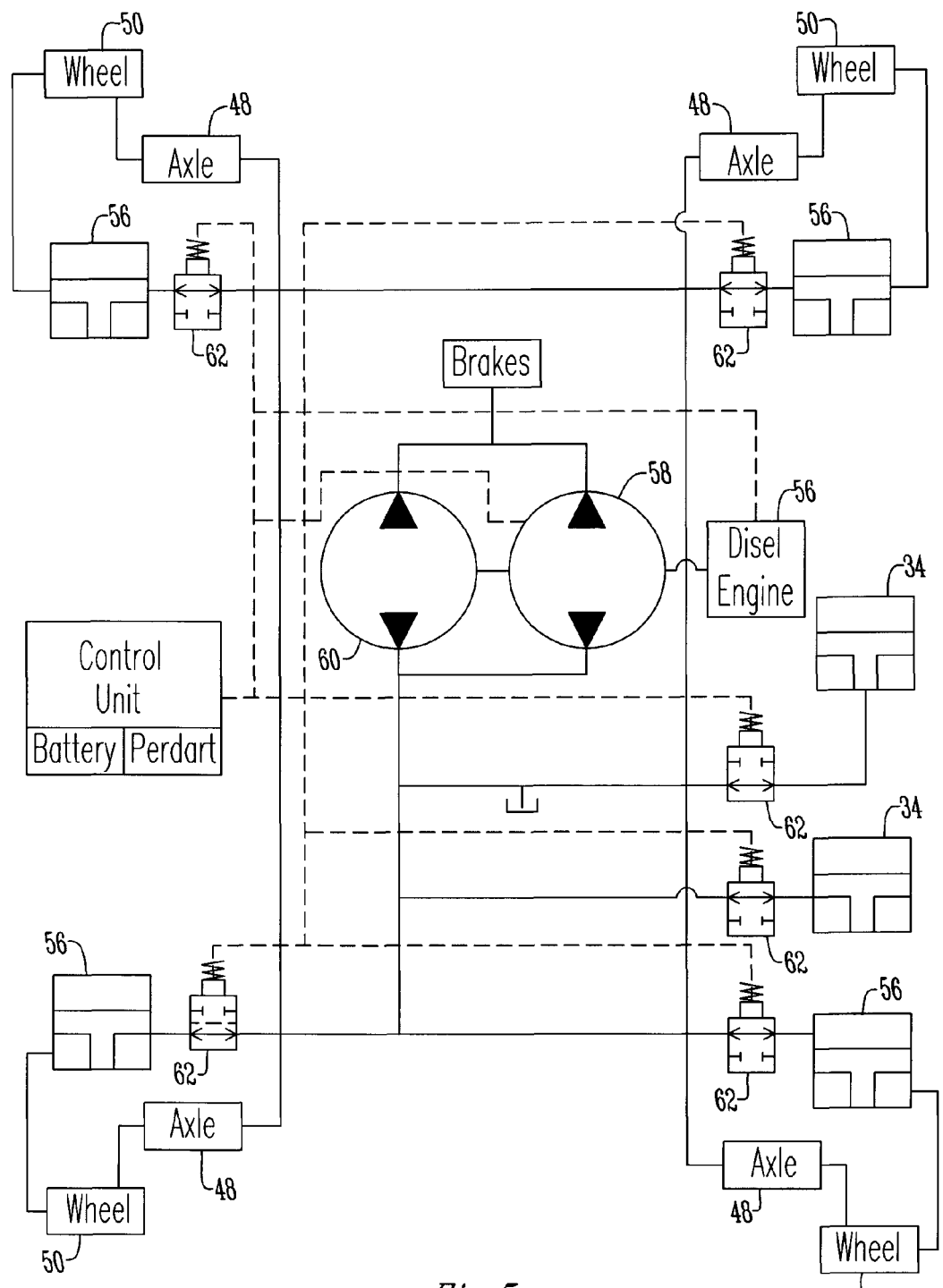
FIG. 5 is a schematic diagram of a remote controlled load transport system.

Presented in the figures is a remote controlled load transport system 10. The remote controlled load transport system 10 has a frame 12 with a first and second side 14 and 16 in spaced parallel relation with one another providing an opening 18 there between. The first side 14 of the frame 12 has a retractable gate assembly 20 with a gate 21 that retracts into the frame 12 and includes a first hydraulic pin 22 that is mounted vertically on the bottom of the frame 12 located opposite where the gate 21 retracts. The first hydraulic pin 22 is received by a sleeve 24 within the gate assembly 20. The first hydraulic pin 22 is actuated after the gate 21 is extended into the side and once actuated prevents the gate 21 from further retracting and provides frame rigidity. The retractable gate assembly 20 additionally has second and third hydraulic pins 26 and 28 that are mounted opposite horizontally on the side where the gate 21 retracts wherein these pins 26 and 28 are actuated after the gate 21 is closed and fit within corresponding recesses in gate 21. The second and third hydraulic pins 26 and 28 interface with a Vee block that is secured to the gate assembly 20 to provide additional rigidity.

Additionally secured to the frame 12 is a lifting assembly 32 that has a plurality of actuators 34 that in a preferred embodiment are four hydraulic cylinders 34. Preferably the lifting assembly 32 only operates when the gate 21 is in a fully closed position. Attached to and operated by the plurality of actuators 34 is a block and cable mechanism 36 that is operated to raise and lower the cables 38 such that an attachment mechanism 40 such as a hook can be placed on the end of the cable 38 in order to attach to a load 42 so that the plurality of actuators 34 can be used to raise and lower the load 42.

Additionally attached to the frame is a suspension 44 that is commonly known as a knuckle suspension. Specifically, the suspension 44 has a plurality of legs 46 that each attach to an axle 45 and wheel 50 wherein each leg 46 has three pivot points 52 that additionally raise and lower the entire frame 12. Thus, a load 42 may be lifted or raised as a result of the raising and lowering of the block and cable mechanism 40 or alternatively can raise as a result of the knuckle suspension 44 raising and lowering the entire frame 12.

Additionally secured to the frame 12 is a mechanical control system 54 that includes a diesel engine 56 that operates first and second hydraulic pumps 58 and 60. The first hydraulic pump 58 is an open loop pump that controls all cylinders of the transport system including the plurality of actuators 34 of the lift assembly 32. The first hydraulic pump 58 also operates brakes and has two speed (high/low) displacements of drives. Meanwhile the second hydraulic pump 60 is an integrated dual closed loop pump that powers hydrostatic drives in order to power each of the axles 48 that control the rotation of the wheels 50. Thus, even if one set of wheels 50 slips, the axles 48 of both wheels 50 continue to rotate to provide driving power to the system 54. Further, hydraulic cylinders 56 at the wheels provide steering function for directing the direction of the wheels 50 such that the wheels 50 can steer at 135 degrees. Each of the cylinders 56 in the system 10 including the lifting cylinders 34 and the cylinders of the control system 56 are electrically controlled as a result in one embodiment of the use of solenoid operated valves 62 for each of the cylinders.

The remote controlled load transport system 10 additionally has an electronic controller 64 that is located remote of the frame 12. Specifically, the electronic controller 64 provides over the air communication through either radio frequency or other communication form as is known in the art to the solenoid controlled valves 62 and other electrically actuated components of the transport system 10 in order to individually operate all functions of the transport system. In this manner the electronic controller 64 can drive and steer the wheels 50 of the transport system and in addition raise and lower a load via the knuckle suspension 44 or block and cable mechanism 36. Additionally, the remote 64 can be used to actuate and retract and lock the gate assembly 20. The electronic controller 64 can have its own independent power source such as a battery 66 and additionally can have a pendant 68 backup for additional functioning.

In operation, the transport system 10 is remotely controlled with the electronic controller 64. When a load 42 is desired to be moved an individual operating the electronic controller 64 retracts the gate assembly 20 and then drives the transport system over the load 42. The plurality of actuators 34 of the lifting assembly 32 are then actuated such that the cables 38 of the block and cable mechanism 36 lower and can be attached to the load 42 via the attachment mechanism 40 on the cable 38. If additional lowering is desired the knuckle suspension 44 can be additionally lowered to bring the frame 12 even closer to the ground. Once the attachment mechanism 40 of the lift assembly 32 is attached to the load 42 the individual remotely raises the cables 38 and additionally can raise the knuckle suspension 44 in order to lift the load 42 from the ground and suspend the load 42 in the air. At this time the gate assembly 20 can be closed and locked with the hydraulic pins 22, 26 or 28 such that the transport system 10 holds the load 42 within the frame 12 of the transport system 10. The individual with the electronic controller 64 can then drive and steer the load 42 including at 135 degrees providing improved maneuverability for transporting the load 42. Once the load 42 is transported to a desired location the individual may lower the load 42 by either utilizing the knuckle suspension system 44 or lowering the cables 38 of the lifting assembly 32 so that the load 42 may be placed in a correct location.

Thus presented is a transport system 10 that is able to lift and transport heavy loads 42 such as bridge sections, road sections, trees and the like. The transport system 10 is able to steer at 135 degrees to provide improved maneuverability over systems presently in the art. Additionally, because the system is remotely controlled the risk to the mover is minimized. Finally, multiple pieces of equipment causing time and labor to be wasted are no longer needed and thus at the very least all of the stated objectives have been met.

What is claimed is:

1. A remote controlled load transport system comprising:
    a frame attached to a suspension that is attached to a wheel;
    a control system having a drive that operates to rotate the wheel;
    an electronic controller remote from the frame and in electronic communication with the control system to drive and steer the wheel;
    wherein the frame has a retractable gate assembly that is electronically controlled by the electronic controller to retract a gate into the frame to accommodate a load.

2. The system of claim 1 wherein the gate assembly has a first hydraulic pin mounted on the frame and is received by a sleeve and prevents the gate of the gate assembly from retracting.

3. The system of claim 2 further comprising a lifting assembly secured to the frame.

4. The system of claim 3 wherein the lifting assembly only operates when the gate is in a fully closed position.

5. The system of claim 3 wherein the actuators operate a block and cable mechanism.

6. The system of claim 1 wherein the suspension is a knuckle suspension having a leg that attaches to an axle and the wheel.

7. The system of claim 6 wherein the suspension has three pivot points to raise and lower the frame.

8. The system of claim 1 wherein the control system is a mechanical control system having an engine and first and second hydraulic pumps.

9. The system of claim 8 wherein the first hydraulic pump is an open loop pump that controls actuators of a lifting system secured to the frame.

10. The system of claim 9 wherein the second hydraulic pump is an integrated dual closed loop pump that powers hydrostatic drives to power the wheel.

11. The system of claim 8 wherein the first hydraulic pump operates a brake and has a two speed displacement drive.

12. The system of claim 1 wherein the wheel is controlled by a hydraulic cylinder that steers the wheel greater than ninety degrees.

13. The system of claim 1 wherein the electronic controller has a pendant.

14. A remote controlled load transport system comprising:
    a frame wherein the frame forms an opening;
    a suspension connected to the frame;
    a plurality of wheels connected to the frame;
    a retractable gate assembly connected to a portion of the frame;
    a lifting assembly having a block and cable mechanism connected to the frame;
    a mechanical control system connected to the frame;
    wherein the mechanical control system drives and steers the plurality of wheels, operates the suspension, operates the gate assembly and operates the lifting assembly;
    an electronic controller remote from the frame and in communication with the mechanical control system;
    wherein the retractable gate assembly provides access to the opening within the frame.

15. The system of claim 14 wherein the retractable gate assembly includes a gate that retracts into the frame.

16. The system of claim 14 wherein access is provided to the opening in the frame when the gate assembly is in an open condition; wherein the frame is closed when the gate assembly is in a closed condition.

17. The system of claim 16 wherein the retractable gate assembly includes a gate that retracts into the frame.

18. The system of claim 16 wherein access is provided to the opening in the frame when the gate assembly is in an open condition; wherein the frame is closed when the gate assembly is in a closed condition.

19. A remote controlled load transport system comprising:
    a frame formed of a plurality of frame members, wherein the plurality of frame members form an opening therebetween;
    a suspension system connected to the frame;
    a plurality of wheels connected to the frame;
    a retractable gate assembly connected to a frame member;
    a lifting assembly having a block and cable mechanism connected to the frame;
    a mechanical control system connected to the frame;
    an electronic controller remote from the frame and in communication with the mechanical control system;
    wherein the retractable gate assembly provides access to the opening within the frame.

* * * * *